United States Patent [19]

Linville

[11] Patent Number: 5,663,758
[45] Date of Patent: Sep. 2, 1997

[54] INSTRUMENT PROBE HAVING A BACK-LIGHTED CAMERA

[75] Inventor: Gregory Linville, Oxnard, Calif.

[73] Assignee: DHV International, Inc., Ventura, Calif.

[21] Appl. No.: 42,737

[22] Filed: Apr. 5, 1993

[51] Int. Cl.$^6$ ...................................................... H04N 7/18
[52] U.S. Cl. .................................................................. 348/85
[58] Field of Search .................................. 348/85, 84, 82, 348/61; 354/63; 166/250; H04N 7/18

[56] References Cited

U.S. PATENT DOCUMENTS

| Re. 24,076 | 10/1955 | Laval, Jr. | 95/11 |
|---|---|---|---|
| 2,093,128 | 9/1937 | Hewitt, Jr. et al. | 354/63 |
| 2,203,176 | 6/1940 | Opocensky | 354/63 |
| 2,737,864 | 3/1956 | Gutterman et al. | 354/63 |
| 2,760,417 | 8/1956 | Laval, Jr. | 95/11 |
| 2,912,495 | 11/1959 | Moon et al. | 348/85 |
| 3,199,613 | 8/1965 | Malott et al. | 175/5 |
| 3,227,804 | 1/1966 | Johnson | 178/6 |
| 3,885,091 | 5/1975 | Fish et al. | 348/84 |
| 3,943,410 | 3/1976 | Kalberer, Jr. et al. | 317/31 |
| 4,035,816 | 7/1977 | Winnacker | 354/64 |
| 4,246,604 | 1/1981 | Hundertmark et al. | 348/84 |
| 4,651,558 | 3/1987 | Martin et al. | 348/84 |
| 4,777,567 | 10/1988 | Welker et al. | 362/32 |
| 4,855,820 | 8/1989 | Barbour | 348/85 |
| 5,107,286 | 4/1992 | Sergeant et al. | 354/64 |
| 5,140,319 | 8/1992 | Riordan | 340/854.9 |
| 5,402,165 | 3/1995 | Linville et al. | 348/85 |

FOREIGN PATENT DOCUMENTS

| 57-211045 | 12/1982 | Japan | 358/100 |
|---|---|---|---|
| 63-292119 | 11/1988 | Japan | 354/63 |

Primary Examiner—Amelia Au
Assistant Examiner—Bryan S. Tung
Attorney, Agent, or Firm—Fulwider Patton Lee & Utecht, LLP

[57] ABSTRACT

An instrument probe contains an improved camera and light source arrangement which; and is positioned behind the camera for providing indirect illumination of the passage being inspected by the camera such as the contents of the bore hole or its casings. The light source is physically separated from the camera thus providing insulation to the camera from heat produced by the light source. The camera housing comprises a quick connect and disconnect latch which allows for the swift changeover of camera components at the distal end of the instrument probe. A parabolic reflector at the light source directs light distally to the instrument body. A second reflector is located on the camera body to further reflect light towards the walls of the passageways, thereby enhancing the indirect light funneled to the area being inspected by the camera.

23 Claims, 5 Drawing Sheets

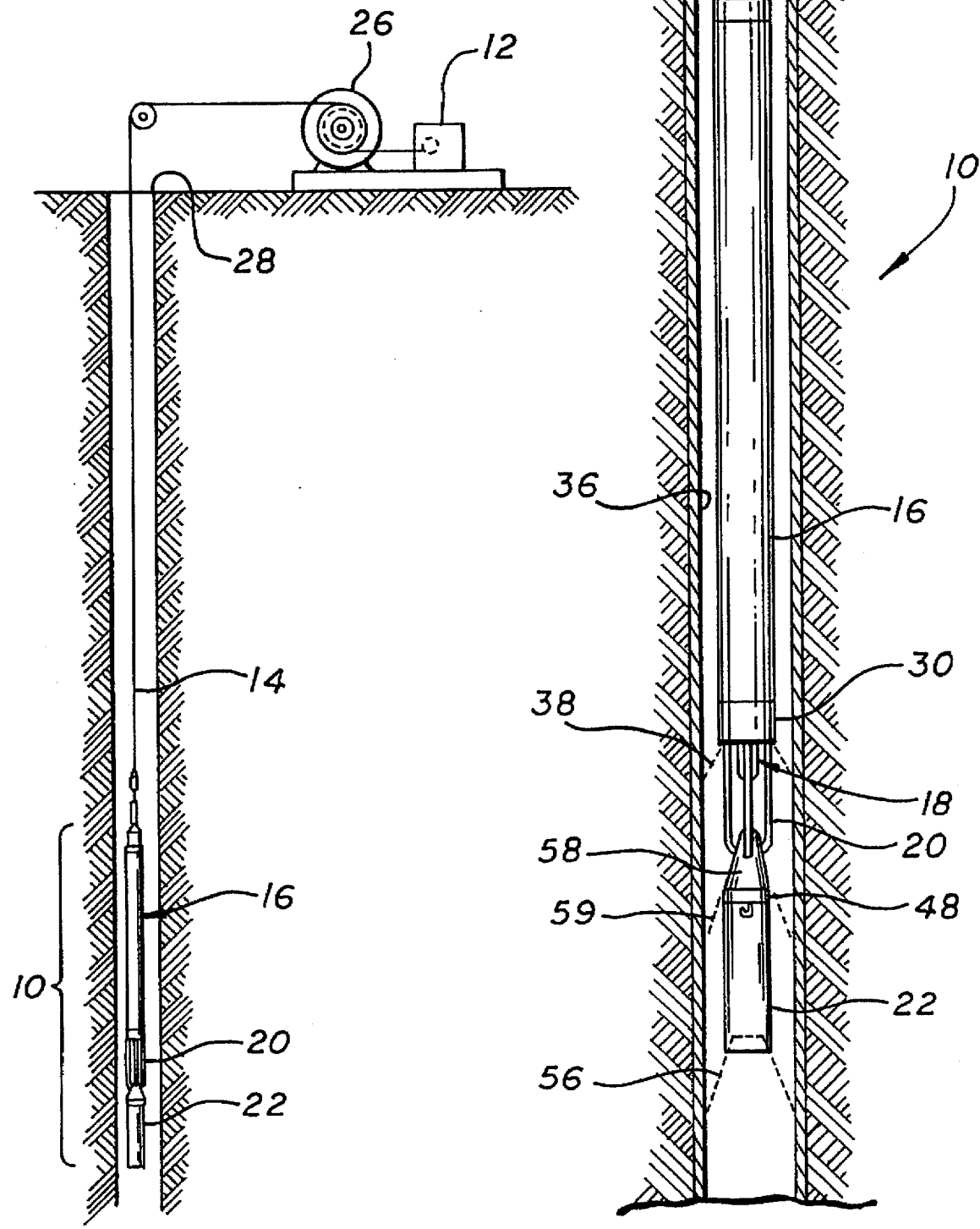

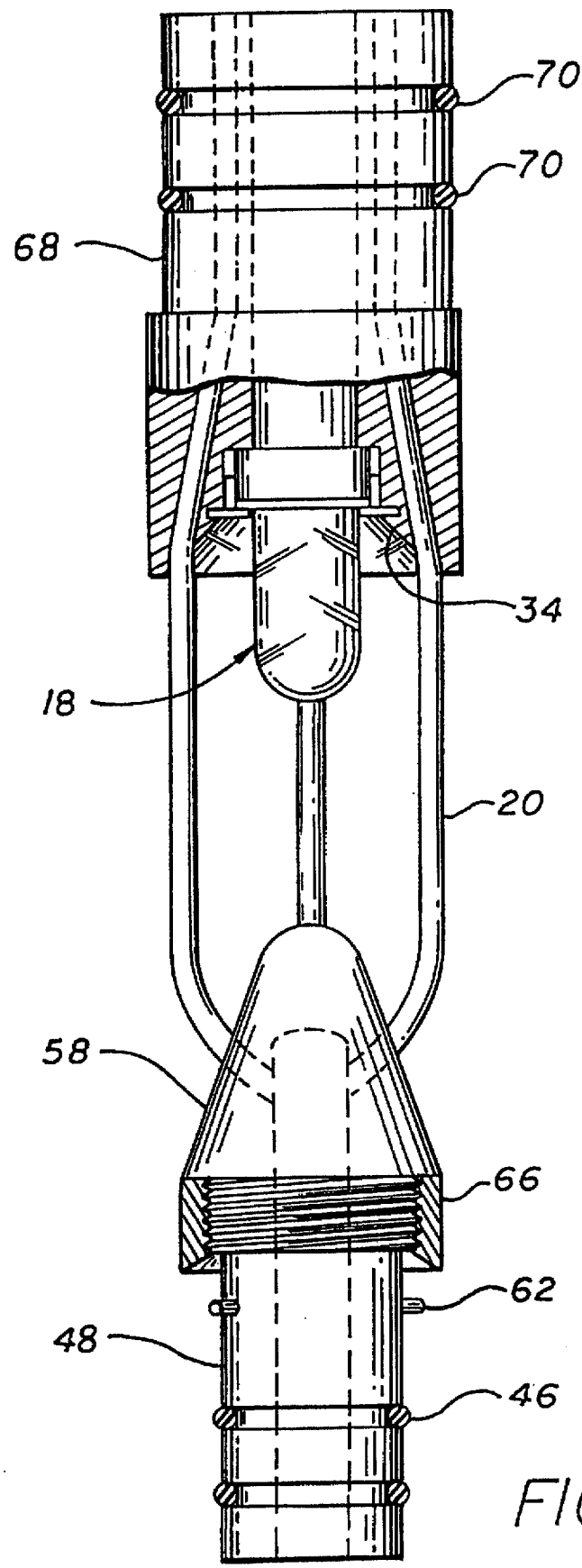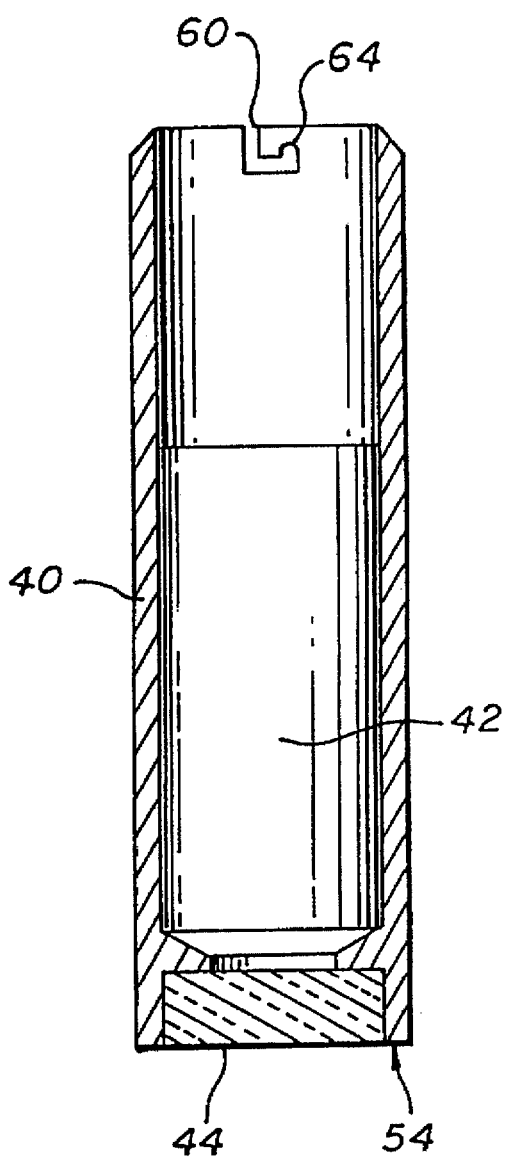
FIG. 6
FIG. 5

INSTRUMENT PROBE HAVING A BACK-LIGHTED CAMERA

BACKGROUND

The invention is related generally to the remote viewing of passageways and other limited access areas and, more particularly, to remotely viewing such limited access areas with an apparatus having a camera and a light source.

There has long been a need in the field of well boring to visually examine the bore hole and its contents for various reasons. In some cases, there is a need to visually examine geological formations. In the case where the well bore has casings and fittings, there is a continuing need to inspect the casings and fittings for corrosion and other conditions. Where the well bore may contain water, oil, or gas or combinations of them, there is sometimes a need to determine if these substances actually exist by viewing the contents of the well bore. There is also a need to determine the entry points of these various fluids. In the case where water is infiltrating an oil well, it would be of value to determine the entry point of the water so that steps may be taken to block the flow of that water into the well. If an examination of the well bore at one location reveals the existence of only oil in the bore, but examination at another location reveals the existence of both oil and water, it can be concluded that water is entering the bore at a point somewhere in between the two examination locations. By gradually moving the viewing instrument through the bore hole between the two locations, the entry point of the water can be found. If that entry point is accessible at one place or another, either in the well bore or somewhere else, the source of the water could be blocked. Thus, determination of an infiltration point can be made by merely examining the contents of the well bore.

However, the fluids in the well bore affect visibility as do any dissolved particulate matter from mineral deposits or the like contained in those fluids. The dissolved compounds are particularly troublesome for visual inspection systems having self-contained light sources as the compounds tend to reduce visibility by reflecting back the light into the camera without adequately illuminating the subject matter to be viewed thus resulting in glare.

A prior technique for viewing well bores used a compact, rugged instrument probe containing a camera, such as a closed circuit television camera, and a light source to illuminate the field of view of the camera. A cable is attached between the instrument probe and the surface station to communicate camera signals to the surface from the instrument probe. The instrument probes for well bores must be rugged to withstand the sometimes harsh conditions encountered in typical operation. For example, hydrostatic well pressures in excess of $4.2 \times 10^6$ kilograms per square meter (6,000 pounds per square inch) and ambient well temperatures of up to and above 190° C. (375° F.) are not uncommon. High heat levels such as these can apply enormous stress to a camera system. Any additional heat applied to the camera brings it that much closer to its operational limits and may cause it to fail. Thus heat is a major concern.

In one prior approach, lamps are arranged around the exterior of the camera in a ring or a "doughnut" to provide lighting on the subject matter viewed by the camera. Unfortunately, because these lamps are mounted so close to the camera, the heat developed by these lamps reaches the camera and may affect its performance as discussed above. Reducing the light output of the lamps to reduce the heat created may also reduce the viewing effectiveness of the camera, especially in environments containing dark oil or other dark substances. A further disadvantage is that this approach provides direct lighting of the subject matter viewed by the camera and may result in glare from well bore contents. And yet a further disadvantage is that mounting such lamps around the camera results in an increase in the diameter of the camera thereby making it unusable in very small well bores.

The use of high intensity lamps to provide illumination of the well bore for the camera provides an unacceptable amount of additional heat if positioned in close proximity to the camera This additional heat added to the already high heat level provided by the environment is undesirable. In another prior technique for avoiding overheating the camera, the light source is separated from the camera by suspending it in front of the camera. The light source then does not provide heat by conduction to the camera yet illuminates the field of view of the camera. While this arrangement has been very useful in many applications, a portion of the field of view of the camera is blocked by the lamp assembly. This is undesirable where the contents of the well bore must be observed rather than just the well bore walls. Additionally, direct illumination of the camera's field of view has hampered visual inspection where substances within the well bore generate glare.

Hence those skilled in the art have recognized the need for an improved lighting arrangement which utilizes high intensity lighting in the well logging instrument while insulating the camera from heat produced by that high intensity lighting. Additionally, it has been recognized that a lighting system which reduces glare is desirable for increased viewing effectiveness. Further, a lighting system which does not increase the diameter of the camera yet does not block the field of view of the camera is desirable. The present invention fulfills these needs and others.

SUMMARY OF THE INVENTION

Briefly and in general terms the present invention provides an instrument probe for visual inspection of a bore hole. The probe has an improved lighting arrangement to provide indirect lighting for a camera. The camera is separated from the light source to insulate the camera from heat produced by the light. Illumination is provided by a high intensity light source mounted to the distal end of an instrument probe body. The camera is suspended in front of the light source by at least one suspension member which is also connected to the distal end of the instrument. The other end of the suspension member or members is connected to the camera to suspend it in front of the light source. Thus, the suspension members separate the camera from the high intensity light and the heat provided by that light source. The camera is mounted so that it faces in the same direction as the light source. Therefore, the light provided by the light source will be indirect lighting to the camera field of view.

Light provided by the light source will be reflected by the walls of the well bore and a parabolic reflector is mounted at the base of the light source in accordance with another aspect of the invention. The parabolic reflector is operative to further direct the light from the light source towards the walls of the bore hole. The light so directed is eventually reflected into the field of view of the camera. The camera also includes a reflector facing the light source for participating in the direction of the light towards the bore hole walls.

Other aspects and advantages of the invention will become apparent from the following detailed description and accompanying drawings, illustrating by way of example the features of the invention.

BRIEF DESCRIPTION OF THE DRAWINGS

FIG. 1 is a view of a down-hole instrument system used in a well bore also showing related surface equipment;

FIG. 2 is an enlarged view of a portion of FIG. 1 showing the down-hole instrument in more detail in which a light source is mounted to the distal end of the instrument and a camera is suspended from that same distal end by means of suspension members;

FIG. 5 is a partially cutaway view of the light and camera mounting arrangement shown in FIG. 4 and showing mounting seals;

FIG. 6 presents a view of a mounting means for mounting the camera to the camera frame;

DESCRIPTION OF THE PREFERRED EMBODIMENTS

Figure 3:
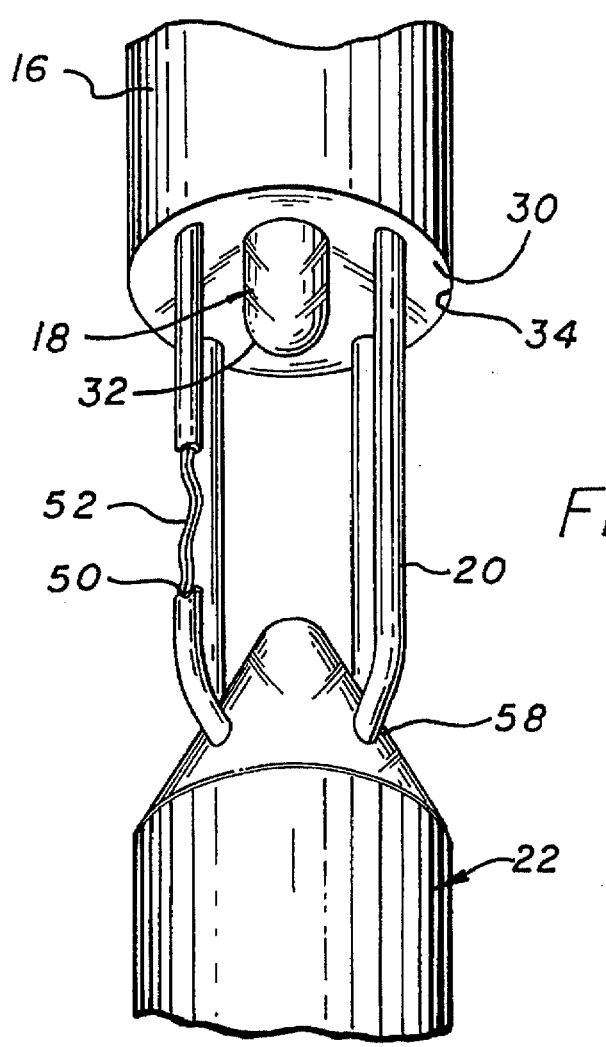
FIG. 3 is an enlarged detail of the lighting system and camera mounting system shown in FIG. 2 in accordance with one aspect of the invention.

In the following description, like reference numerals will be used to refer to like or corresponding elements in the different figures of the drawings. Referring now to the drawings with more particularity, FIG. 1 shows a well logging instrument probe 10 connected to a surface station 12 by a cable 14. The cable 14 comprises transmission lines to transmit communication and power signals between the instrument probe 10 and the surface station 12. Referring now additionally to FIG. 2, the instrument probe 10 comprises essentially four main components: an instrument body 16, a high intensity light source 18, a plurality of suspension members 20 and a camera 22. The instrument body 16 also includes transmission lines which interconnect other components of the probe 10 to the cable 14. The cable 14 is connected to the proximal end 24 of the instrument body 16 by any conventional manner known in the art which adequately secures the probe 10 to the cable 14 and provides for the electrical connections between the instrument body and the cable transmission lines. In addition to conducting signals and power, the cable 14 is used to lower and raise the instrument probe 10 within the well bore 28 by means of the rotation of a spool 26 about which the cable 14 is wound. The spool 26 is located at the surface station 12.

Figure 4:
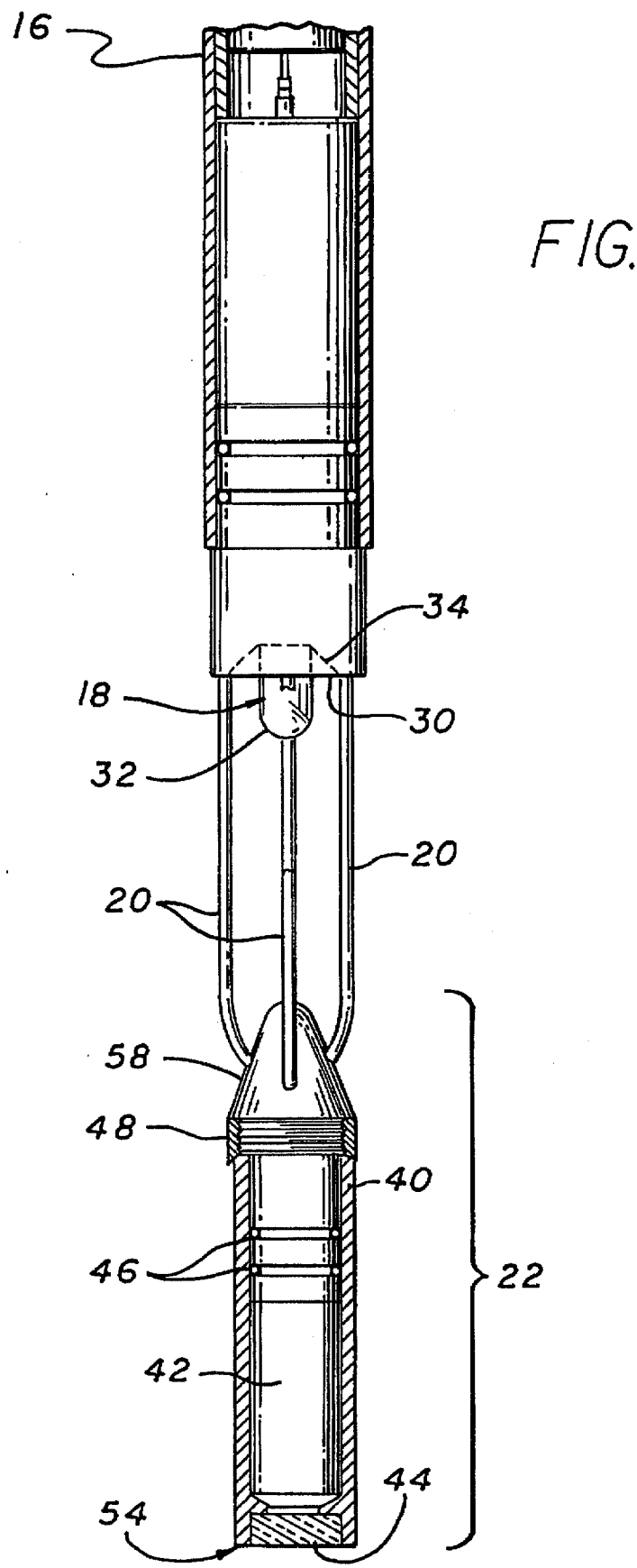
FIG. 4 is a side view of the lighting and camera system in accordance with certain aspects of the invention.

Referring now to FIGS. 3 and 4, the high intensity light source 18 is mounted onto the distal end 30 of the instrument body 16. The light source 18 comprises a high intensity lamp, preferably a halogen or quartz bulb, contained within a lamp housing 32. The bulb is mounted in a lamp socket which may be any commercially available socket which supports the selected lamp. The lamp and socket are surrounded by the lamp housing 32 which is clear and water tight and which may be threadably connected to the distal end 30 of the instrument body 16. The lamp socket is wired to the power transmission lines within the instrument body 16. Disposed at the base of the light source 18 is a concave parabolic reflector 34. The concave reflector 34 has a polished metal surface such as stainless steel and is shaped to direct the light generated by the light source 18 distally from the instrument body 16 towards the well bore walls 36 and the camera 22.

As is apparent from FIGS. 1–4, the camera 22 is located distally to the light source 18 which puts it within the field of illumination 38 (FIG. 2) created by the light source 18 and the concave reflector 34. The plurality of suspension members 20 are used to rigidly mount the camera 22 to the distal end 30 of the instrument body 16. In the case shown in FIGS. 1–4, four suspension members 20 are used; however, more or fewer may be used as required. These are mounted to the distal end 30 of the instrument body 16 and the proximal end of the camera 22 and by so mounting, do not increase the overall diameter of the probe 10. Additionally, suspending the camera 22 at a distance from the light source 18 provides some insulation for the camera 22 from the heat produced by the light source 18. This insulation can be of utmost importance where the camera 22 is already undergoing significant stress in a high-heat environment.

Referring in more detail to FIG. 4, the camera 22 comprises a camera housing 40 within which is mounted a video camera 42, a lens 44, seals 46, and a mounting frame 48. The suspension members 20 rigidly connect the camera mounting frame 48 to the distal end 30 of the instrument body 16. The connection may be achieved by welding the members 20 to the distal end 30 and camera 22 or by threading the ends of the suspension members 20 and securing them with nuts. Referring briefly to FIG. 3, a least one of the suspension members 20 comprises a hollow cavity 50 which contains the power and signal lines to convey power and data signals between the camera 22 and the instrument body 16. The suspension members 20 have a predetermined length to separate the camera 22 from the light source 18. This length in one embodiment was selected such that an object positioned in front of the camera lens at a distance of approximately 36 inches (91 mm) could be clearly seen by the camera with the light source used. This was tested for different diameter pipes including pipes having a diameter of approximately 2 inches (5 mm) and pipes having an outer diameter of 13 inches (33 mm).

Mounted to the distal end 54 of the camera 22 is the lens 44. The video camera 42 is mounted inside the camera housing 40 adjacent the lens 44 and coupled thereto for viewing purposes. The field of view 56 (shown in FIG. 2) of the camera with the lens is distal to the camera 22 and therefore also to the light source 18 and instrument body 16. The seals 46 inside the camera housing 40 protect the video camera 42 from damage which may be otherwise caused by leaking liquids or gases. The mounting frame 48 receives the housing 40 to mount the housing to the suspension members 20 and so to the instrument body 16. A threaded connection is shown in this embodiment. The lens 44 may have a wide angle or other optical characteristic to direct the field of view 56 of the video camera 42 for a particular purpose.

In the embodiments shown in FIGS. 2–4, the camera 22 also comprises a convex parabolic reflector 58 which faces the light source 18 and is shaped to direct light away from the camera 22 towards the walls 36 of the well bore. The illumination angle of this convex reflector 58 is indicated by the numeral 59 in FIG. 2. In this way, further light is directed at the well bore walls 36 which will reflect to a position in the field of view 56 of the camera to result in indirect lighting. This reflector may also be formed of stainless steel or other suitable reflective substance. The angle 59 of reflection is selected in one embodiment to be equal to the angle of the light source reflector 34.

Referring now to FIGS. 5 and 6, the camera housing 40 has at least two J-shaped notches 60, one of which is shown in FIG. 6, at its opening. These notches engage corresponding pins 62 mounted to the camera frame 48. The housing 40 is first slid onto the pins 62 and then rotated to move the horizontal portion of the notch 60 to engage the pins 62. After the rotation, the housing is then slid again to engage the termination portion 64 of each notch of the housing with the pins 62. The pin/notch combination locks the housing 40 to the camera frame 48. A cap 66 threadably connected to the camera frame 48 is then rotated until the cap 66 contacts the camera housing 40. Once the cap 66 is screwed into contact with the camera housing 40, the J-latch is maintained in a locked position. The O-ring seals 46 mounted in channels formed into the camera frame 48 contact the inside of the camera housing 40 to seal the camera instrumentation from exposure to the harsh conditions within the well bore 28. The wires to be connected between the video camera 42 and the suspension members 20 may be coupled together by means of a connector located on a bulkhead. Alternately, there may be a terminal block at a bulkhead at the video camera to which the wires are secured such as by soldering. Other wiring techniques, such as hard-wiring directly between the camera and the instrument body equipment, may be used.

Additionally, other techniques to mount the camera housing 40 to the frame 48 may be used. Set screws rather than J-shaped notches may be employed. In the alternative, the housing may be threaded for connection to the frame.

Referring further to FIG. 5, the light source/camera assembly of another embodiment includes an adaptor 68 configured to connect the present light and camera assembly to the instrument body 16. Mounted to the adapter 68 are the light source 18, the parabolic reflector 34, the suspension members 20, the reflector 58 on the camera 22, and the camera 22 itself. The adapter 68 includes fluid seals 70 mounted in channels. O-ring type seals are shown. The instrument body 16 includes an opening for receiving the adapter 68 and a connector for coupling the wires from the light/camera assembly to corresponding wires in the instrument body 16. When a back light arrangement becomes necessary, the existing camera is removed from the instrument body 16 and is replaced with the light source/camera and adapter 68 assembly shown in FIG. 5. This feature permits interchangeable components in a down hole instrument thus increasing its versatility. Fewer instruments must be carried into the field when more versatile instruments such as that shown here are used. Each instrument may be configured in different ways for different applications.

Referring now again to FIG. 2, the field of illumination 38 of the light source 18 and the field of illumination provided by the reflector 58 both strike the bore hole walls 36 and do not directly illuminate the field of view 56 of the camera 22. It has been found that this arrangement results in improved lighting of the contents of the bore hole 28 for the camera 22. It is believed that this arrangement provides indirect lighting of the bore hole contents thereby reducing glare and increasing visibility.

Additionally, a high intensity light source 18 may be used because of its physical separation from the camera 22. Thus, more light is provided than if low intensity/low heat producing light sources were used. The mounting of the suspension members 20 to the distal end of the instrument body rather than to the periphery and the use of a reduced diameter camera frame 48 to which to mount the other ends of the suspension members 20 to the camera 22 result in maintaining the diameter of the probe 10 at the dimension required by the instrument body. In other words, the camera/light source assembly does not increase the diameter of the probe. This also increases the versatility of the probe. Adding the light source shown herein does not limit the probe to only larger bore holes.

Figure 7:
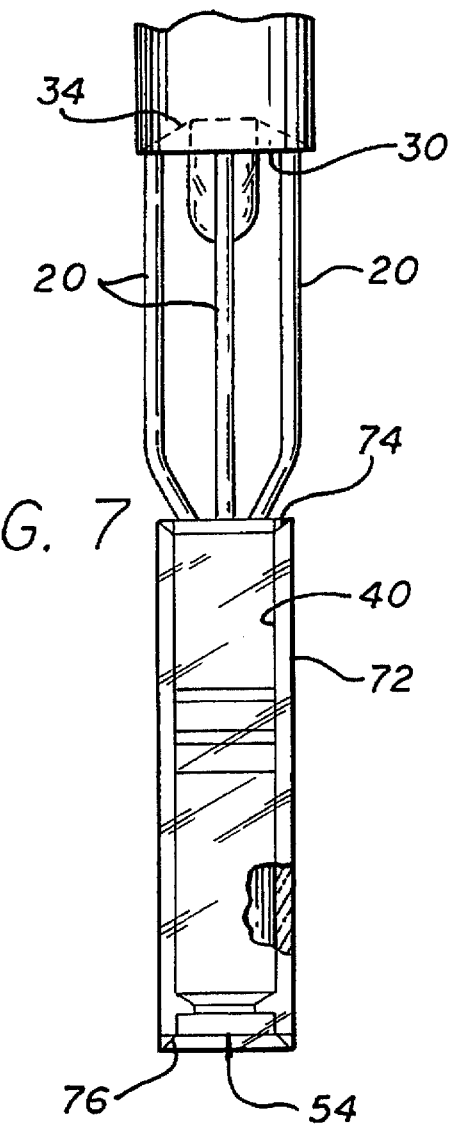
FIG. 7 presents an alternate embodiment where a light cylinder is mounted about the camera.

Turning now to FIG. 7, another embodiment is shown. The camera housing 40 is covered by a light transmission sleeve 72. The sleeve 72 comprises a light transmission medium such as glass or plastic or other substance capable of conducting light without substantial attenuation. The sleeve 72 receives light from the light source 18, conducts that light to the distal end 54 of the camera, and radiates that light into the closer part of the field of view of the camera 22. The upper 74 and lower 76 edges of the sleeve 72 are beveled to collect light from the light source and transmit the light to the field of view of the camera. The upper bevel is facing the light source 18 and the lower bevel is facing the lens 44. In this embodiment, the light source 18 continues to provide indirect lighting for the field of view of the camera 22 while the sleeve 72 provides a greater amount of light for the field of view closer to the camera lens 44.

Figure 8:
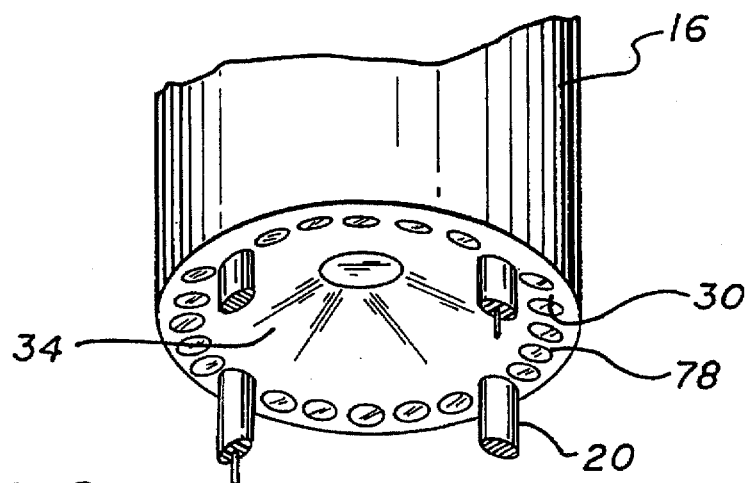
FIG. 8 presents a further embodiment wherein multiple light sources are mounted to the distal end of the instrument body.

In yet another embodiment shown in FIG. 8, the light source 18 may comprise a ring of high intensity lights 78 mounted in the reflector 34 on the distal end 30 of the instrument body 16. Each of the lights in this ring of lights is mounted on the reflector and is thus at the angle of that portion of the reflector in which they are located. Their light output is thus directed to the bore hole walls so that they also provide indirect light to the field of view of the camera 22.

Figure 9:
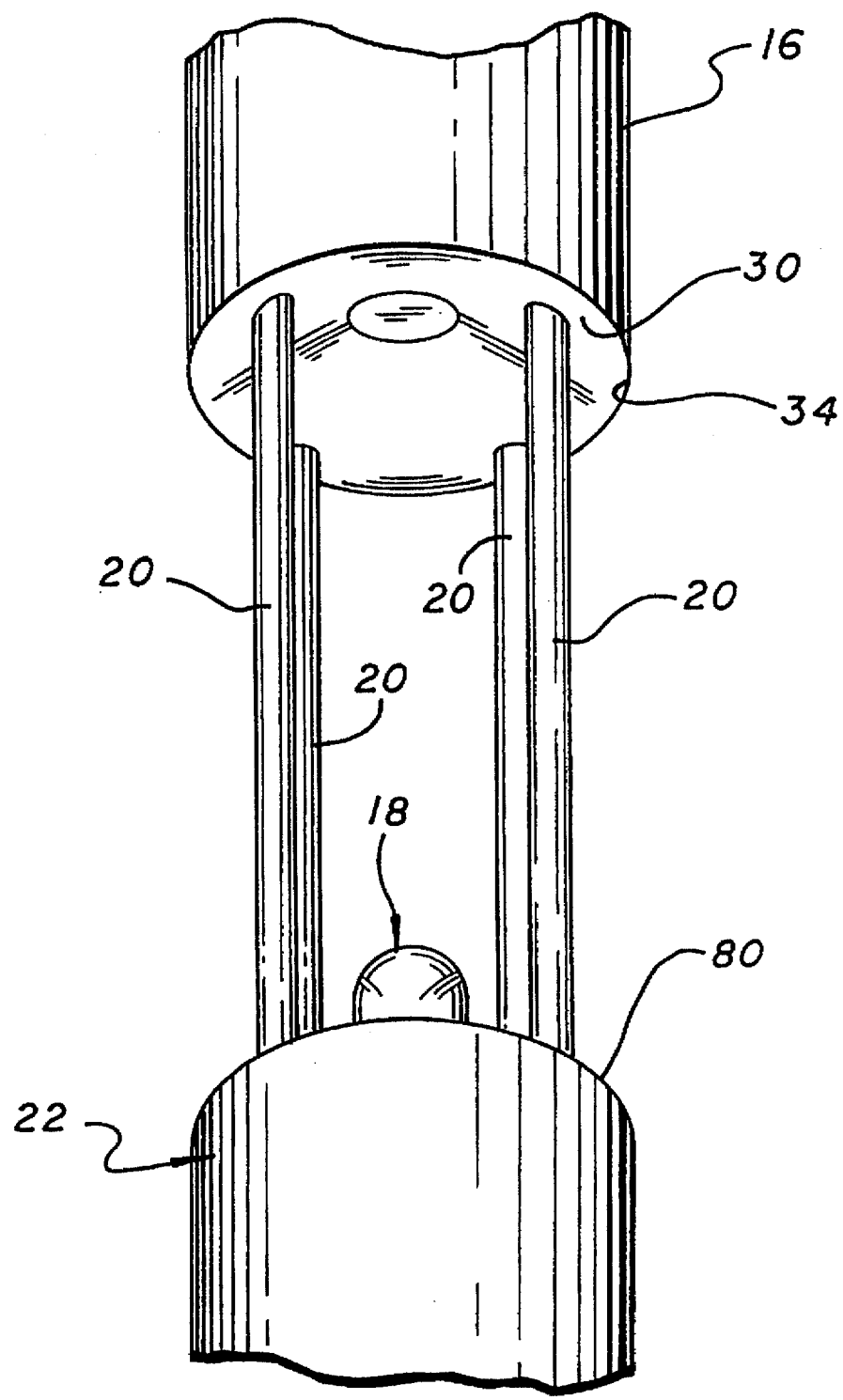
FIG. 9 presents an additional embodiment wherein the light source is mounted at the proximal end of the camera.

The embodiment shown in FIG. 9 illustrates the mounting of the light source 18 to the proximal end 90 of the camera 22 rather than to the distal end 30 of the instrument body 16. However, the light source 18 remains in line with the longitudinal axis of the instrument body 16 and provides indirect lighting. Light from the light source 18 will be reflected by the reflector 34 mounted on the distal end 30 of the instrument body 16 for provision to objects in front of the lens 44. The lamp used in the light source 18 is surrounded by a lamp cover 34 as in previous embodiments and this lamp cover 34 is placed in the environment so that the heat developed by the lamp will be dispersed in the bore hole rather than provided to the camera 22. The light source 18 is thus insulated from the camera 22.

Thus, in accordance with the invention, a new and useful instrument probe is provided having an improved lighting arrangement for illumination of the field of view of the camera. Also provided is a quick connect and disconnect feature to allow for swapping the camera/light source assembly with the instrument body.

It will be apparent from the forgoing that while particular forms of the invention have been illustrated and described, various modifications can be made without departing from the spirit and scope of the invention. Accordingly, it is not intended that the invention be limited except this by the appended claims.

What is claimed is:

1. An instrument probe for insertion in an elongated passageway having a side wall, for viewing the contents of the passageway, the instrument probe connected to a surface station by means of a cable, the instrument probe comprising:

an instrument body having a size smaller than the elongated passageway for insertion into the passageway, and having a longitudinal axis, a proximal end, and a distal end, the proximal end of the instrument body being connected to the cable;

an unenclosed light source mounted to the exterior of the instrument body at the distal end thereof such that the light source provides a field of illumination in a direction distal to the instrument body and radially expanding with respect to the longitudinal axis such that light emitted by the light source directly illuminates the wall of the passageway and is reflected by said wall and such that said field of illumination does not contain the instrument body;

at least one suspension member mounted to the distal end of the instrument body;

a camera mounted to the suspension member such that the camera is disposed within the field of illumination of the light source, the camera further being mounted such that the camera's field of view is pointing in the same direction as the field of illumination of the light source and is directed to radially expand in respect to the longitudinal axis; and wherein the suspension member has a length which is selected such that the camera and the light source are separated from each other by an amount dependant upon the diameter of the passageway so that only light from the light source that is reflected by the passageway wall reaches the camera's field of view.

2. The instrument probe as recited in claim 1, wherein:
the camera includes a convex reflector formed over the proximal end of the camera, the convex reflector having a dome shape for reflecting light directed at the proximal end of the camera along the field of view away from the light source.

3. The instrument probe as recited in claim 1, wherein:
the light source includes a plurality of lamps mounted on the distal end of the instrument probe and forming a ring of light radially centered at the longitudinal axis of the instrument body wherein the diameter of the ring of light is not greater than the diameter of the instrument body.

4. The instrument probe of claim 1 wherein the unenclosed light source comprises a reflector having a shape that reflects light from the light source directly to the wall of the passageway.

5. The instrument probe of claim 4 wherein the reflector comprises a convex parabolic reflector.

6. The instrument probe of claim 1 wherein the camera includes a second reflector formed over the proximal end of the camera, the second reflector having a dome shape for reflecting light received at the proximal end of the camera from the unenclosed light source directly to the wall of the passageway.

7. The instrument probe of claim 1 wherein the light source comprises a single bulb mounted at the center of the distal end of the instrument body;
a plurality of suspension members are mounted to the distal end of the instrument body; and
the camera is mounted to the suspension members such that the camera is suspended in front of the bulb and in the field of illumination created by the bulb, and is also centered in relation to the instrument body.

8. An instrument probe for insertion in an elongated passageway having a side wall, for viewing the contents of the passageway, the instrument probe connected to a surface station by means of a cable, the instrument probe having an instrument body with a longitudinal axis, a proximal end, and a distal end, the proximal end of the instrument body being connected to the cable, the instrument probe comprising:

an unenclosed light source mounted to the distal end of the instrument body such that the light source provides a field of illumination that directly illuminates the side wall of the passageway forward of the instrument body; and a camera for viewing the passageway, wherein the camera is mounted to the distal end of the instrument body and separated from the light source longitudinally and is disposed within the field of illumination of the light source, the camera being mounted such that the camera provides a field of view forward of the instrument body, and is separated from the unenclosed light source by a distance selected so that the field of view of the camera receives only indirect illumination from the light source;

whereby the light source thereby provides only indirect lighting to the field of view of the camera.

9. The instrument probe of claim 8 wherein said light source further comprises a reflector mounted to the distal end of the instrument body for directing the light provided by said light source directly to the side wall of the passageway for reflection into the field of view of the camera.

10. The instrument probe of claim 9 wherein the reflector comprises a concave parabolic reflector.

11. The instrument probe of claim 9 wherein the camera includes a second reflector formed over a proximal end of the camera, the second reflector having a dome shape for reflecting light received at the proximal end of the camera in the general direction of the field of view of the camera.

12. The instrument probe of claim 8 further comprising:
at least one suspension member mounted to the distal end of the instrument body, the camera being mounted to the suspension member; wherein
the suspension member has a length selected so that the camera and the light source are separated from each other by a predetermined distance.

13. The instrument probe of claim 8 wherein the light source comprises a plurality of lamps mounted to the distal end of the instrument probe and arranged in a ring wherein the diameter of the ring of light sources does not exceed the diameter of the instrument body.

14. The instrument probe of claim 8 wherein the light source comprises a single bulb mounted at the center of the distal end of the instrument body;
a plurality of suspension members are mounted to the distal end of the instrument body; and
the camera is mounted to the suspension members such that the camera is suspended in front of the bulb and in the field of illumination created by the bulb, and is also centered in relation to the instrument body.

15. The instrument probe of claim 8 wherein the camera comprises a light conducting device adapted to receive light from the light source, conduct the received light to the distal end of the camera, and emit the light into the field of view of the camera.

16. The instrument probe of claim 15 wherein the light conducting device comprises a light conducting sleeve extending from the proximal end of the camera to the distal end of the camera and positioned about the camera so as to receive light from the light source at the proximal end of the camera, conduct the received light to the distal end of the camera, and emit the received light into the field of view of the camera.

17. The instrument probe of claim 8 wherein:
the camera includes a camera housing having a plurality of slots, the camera being mounted in the camera housing; and the camera includes a camera frame having a plurality of pins, the camera frame being connected to the distal end of the instrument body;

whereby the camera can be connected to the instrument body by engaging the slots of the camera housing with the pins of the camera frame.

18. An instrument probe for insertion in an elongated passageway having a side wall for viewing the contents of the passageway, the instrument probe connected to a surface station by means of a cable, the instrument probe having an instrument body having a longitudinal axis, a proximal end, and a distal end, the proximal end of the instrument body being connected to the cable, the instrument probe comprising:

a light source mounted to the distal end of the instrument body such that the light source provides a field of illumination forward of the instrument body and directly illuminates the side wall of the passageway, said light source comprising a reflector mounted to the distal end of the instrument body for directing the light from the light source to the side wall;

a camera for viewing the passageway, the camera mounted to the distal end of the instrument body and separated from the light source longitudinally and disposed within the field of illumination of the light source, the camera being mounted such that the camera provides a field of view forward of the instrument body and in a direction parallel to the longitudinal axis of the instrument body; and at least one suspension member mounted to the distal end of the instrument body, the camera being mounted to the suspension member;

wherein the suspension member has a length selected so that the camera and the light source are separated from each other by a predetermined distance dependant upon the diameter of the passageway so that only light from the light source that is reflected by the passageway side wall reaches the camera's field of view.

19. The instrument probe of claim 18 comprising a plurality of suspension members mounted between the distal end of the instrument body and the camera to suspend the camera within the field of illumination provided by the light source and to separate the camera from the light source by a predetermined distance.

20. The instrument probe of claim 18 wherein the light source comprises a single bulb mounted at the center of the distal end of the instrument body;

a plurality of suspension members are mounted to the distal end of the instrument body; and the camera is mounted to the suspension members such that the camera is suspended in front of the bulb and in the field of illumination created by the bulb, and is also centered in relation to the instrument body.

21. The instrument probe of claim 18 wherein the camera comprises a light conducting device adapted to receive light from the light source, conduct the received light to the distal end of the camera, and emit the light into the field of view of the camera.

22. The instrument probe of claim 21 wherein the light conducting device comprises a light conducting sleeve extending from the proximal end of the camera to the distal end of the camera and positioned about the camera so as to receive light from the light source at the proximal end of the camera, conduct the received light to the distal end of the camera, and emit the received light into the field of view of the camera.

23. An instrument probe for insertion in an elongated passageway having a side wall for viewing the contents of the passageway, the instrument probe connected to a surface station by means of a cable, the instrument probe having an instrument body having a longitudinal axis, a proximal end, and a distal end, the proximal end of the instrument body being connected to the cable, the instrument probe comprising:

an unenclosed light source mounted to the exterior of the instrument body at the distal end thereof and disposed at approximately the center of the distal end of the instrument such that the light source provides a field of illumination forward of the instrument body which does not contain the instrument body, the light source having a reflector mounted at the distal end of the instrument body for directing the light from the light source to directly illuminate the side wall of the passageway;

a plurality of suspension members mounted to the distal end of the instrument body;

a camera for viewing the passageway, the camera mounted to the suspension members so that the camera is separated from the light source longitudinally by a predetermined distance and is disposed within the field of illumination of the light source, the camera being mounted such that the camera provides a field of view forward of the instrument body, said predetermined distance being great enough so that light from the light source only reaches the field of view of the camera after being reflected by the side wall of the passageway thereby providing indirect illumination from the light source to the field of view of the camera; and a second reflector formed over the proximal end of the camera, the second reflector having a dome shape for reflecting light received at the proximal end of the camera directly to the side wall of the passageway.

* * * * *